(12) United States Patent
Dill et al.

(10) Patent No.: US 10,493,869 B2
(45) Date of Patent: Dec. 3, 2019

(54) BACKREST ADJUSTER FOR A SEAT, AND VEHICLE SEAT

(71) Applicant: JOHNSON CONTROLS COMPONENTS GMBH & CO. KG, Kaiserslautern (DE)

(72) Inventors: Thomas Dill, Heiligenmoschel (DE); Olaf Kreuels, Zweibrücken (DE); Wolfgang Pluta, Heiligenmoschel (DE); Jan Simo, Trencin (SK); Christian Wolf, Dielkirchen (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 245 days.

(21) Appl. No.: 15/322,281

(22) PCT Filed: Jun. 26, 2015

(86) PCT No.: PCT/EP2015/064573
§ 371 (c)(1),
(2) Date: Dec. 27, 2016

(87) PCT Pub. No.: WO2016/001096
PCT Pub. Date: Jan. 7, 2016

(65) Prior Publication Data
US 2017/0136921 A1    May 18, 2017

(30) Foreign Application Priority Data

Jul. 3, 2014    (DE) .................... 10 2014 212 976
Oct. 9, 2014    (DE) .................... 10 2014 220 747

(51) Int. Cl.
*B60N 2/20*    (2006.01)
*B60N 2/12*    (2006.01)

(52) U.S. Cl.
CPC ............... *B60N 2/206* (2013.01); *B60N 2/12* (2013.01); *B60N 2/20* (2013.01)

(58) Field of Classification Search
CPC ............. B60N 2/206; B60N 2/12; B60N 2/20
See application file for complete search history.

(56) References Cited

U.S. PATENT DOCUMENTS

| 5,927,809 A | 7/1999 | Tame |
| 6,336,679 B1 | 1/2002 | Smuk |
| 7,857,392 B2 * | 12/2010 | Hayakawa ............. B60N 2/206 297/378.1 |

(Continued)

FOREIGN PATENT DOCUMENTS

| CN | 103 079 878 A | 5/2013 |
| CN | 103 223 881 A | 7/2013 |

(Continued)

*Primary Examiner* — David R Dunn
*Assistant Examiner* — Tania Abraham
(74) *Attorney, Agent, or Firm* — McGlew and Tuttle, P.C.

(57) ABSTRACT

A backrest adjuster (4) is provided for a seat. The seat includes a backrest (1) that can be adjusted relative to a seat part (2) by a fitting (5) and which is arranged in a longitudinally displaceable manner. When the backrest (1) is displaced from a seating position (P1) to an entry position (P2), a gear unit (9) actuates a tension element (7) that unlatches a rail adjuster (10.1) and latches same when the backrest (1) is displaced in the opposite position. A vehicle seat is provided that includes such a backrest adjuster (4).

20 Claims, 4 Drawing Sheets

(56) References Cited

U.S. PATENT DOCUMENTS

| | | | | |
|---|---|---|---|---|
| 2003/0080601 A1* | 5/2003 | Charras | ............... | B60N 2/206 |
| | | | | 297/378.12 |
| 2003/0122412 A1* | 7/2003 | Niimi | ............... | B60N 2/0705 |
| | | | | 297/341 |
| 2009/0096270 A1 | 4/2009 | Halbig et al. | | |
| 2014/0217794 A1* | 8/2014 | Emrich | ............... | B60N 2/20 |
| | | | | 297/337 |
| 2015/0375646 A1* | 12/2015 | Lee | ............... | B60N 2/20 |
| | | | | 297/463.1 |

FOREIGN PATENT DOCUMENTS

| | | |
|---|---|---|
| DE | 43 40 696 C1 | 6/1995 |
| DE | 103 39 788 A1 | 3/2004 |
| DE | 10 2004 030 320 A1 | 2/2006 |
| DE | 10 2004 051 873 A1 | 4/2006 |
| DE | 20 2006 015 156 U1 | 2/2007 |
| DE | 10 2009 025 999 A1 | 1/2010 |
| DE | 10 2010 039 465 A1 | 2/2012 |
| DE | 10 2012 205 630 A1 | 10/2012 |
| FR | 2 843 922 A1 | 3/2004 |
| WO | 99/38723 A1 | 8/1999 |
| WO | 2014/053400 A1 | 4/2014 |
| WO | 2014/128297 A1 | 8/2014 |

\* cited by examiner

BACKREST ADJUSTER FOR A SEAT, AND VEHICLE SEAT

CROSS REFERENCE TO RELATED APPLICATIONS

This application is a United States National Phase Application of International Application PCT/EP2015/064573 filed Jun. 26, 2015 and claims the benefit of priority under 35 U.S.C. § 119 of German Applications 10 2014 212 976.1 filed Jul. 3, 2014 and 10 2014 220 474.7 filed Oct. 9, 2014, the entire contents of which are incorporated herein by reference.

FIELD OF THE INVENTION

The invention relates to a backrest adjuster for a seat which comprises a backrest that is adjustable relative to a seat part by means of a fitting, and which is arranged in a longitudinally movable manner.

BACKGROUND OF THE INVENTION

Furthermore, the invention relates to a vehicle seat comprising such a backrest adjuster.

Various backrest adjusters having easy-entry functions are known from the prior art, these allowing easier entry into a rear, for example second seat row of a vehicle. The easy-entry function is actuable by an actuating or unlocking lever which is usually arranged on a backrest of the vehicle seat, with the result that the backrest of the vehicle seat pivots out of an entry region. If the seat is arranged on rails, the vehicle seat can additionally or alternatively be displaceable out of the entry region in the direction of travel when the actuating or unlocking lever is actuated.

SUMMARY OF THE INVENTION

An object of the present invention is to specify an improved backrest adjuster for a seat, and also a vehicle seat having such a backrest adjuster.

The backrest adjuster is provided for a seat which comprises a backrest that is adjustable in terms of inclination relative to a seat part by means of a fitting, and which is arranged in a longitudinally movable manner. According to the invention, when the backrest is moved from a sitting position into an entry position, a transmission unit actuates a tension element such that the latter unlocks a rail adjuster, and locks the latter when the backrest is moved in the opposite direction. A movement of the backrest should be understood as meaning in particular pivoting of the backrest about a pivot axis S oriented parallel to a transverse axis.

In this case, the tension element is linked to a rail unlocking mechanism at one end and also linked to the transmission unit at an opposite, fitting-side end.

The transmission unit is in particular a two-member coupling unit which comprises a rocker and a coupler. The rocker is mounted in a rotatable manner on a seat-part-side fitting part. The coupler is linked to a backrest-side fitting part in a rotatable manner at one end and is linked to the rocker at the opposite end. The tension element connects the rocker to a rail unlocking mechanism.

The advantages achieved by the invention are in particular that conventional, contour-controlled actuation of the tension element is avoided and thus contact control and mechanical stresses resulting therefrom are avoided. As a result of the transmission unit being configured with a coupler and rocking function, tensile actuation, in particular Bowden-cable actuation, is considerably improved.

As a result of a small overall size of the backrest adjuster compared with the prior art, a distance between a user of the seat and the backrest adjuster is significantly increased and advantageously sitting comfort is increased and/or a risk of injury caused by a collision is reduced.

In one development of the backrest adjuster, when the backrest is moved from the entry position into a cargo floor position, the transmission unit actuates the tension element such that the latter locks the rail adjuster, and unlocks the latter when the backrest is moved in the opposite direction.

This ensures that, in the cargo floor position, the folded-together seat is prevented from being displaced. When the backrest is moved from the cargo floor position into the entry position, displacement of the seat is allowed, resulting in an advantage for a user, and no further actuating elements need to be actuated in order to fold the seat into the entry position.

In another development of the backrest adjuster, the transmission unit is configured in a multipart manner and comprises at least one rocker and one coupler. The rocker and the coupler are cost-effective to produce compared with the prior art and have particularly small dimensions, wherein a space saving and a cost saving are achieved.

According to a further embodiment of the backrest adjuster, the transmission unit is configured in a two-part manner and comprises at least the one rocker and the one coupler. By means of the two-part configuration of the transmission unit, a component reduction is allowed.

In one configuration of the backrest adjuster, the rocker is mounted in a rotatable manner on a fitting lower part that is arranged on the seat part, and the coupler is linked to a backrest-side fitting upper part in a rotatable manner at one end and is linked to the rocker in a rotatable manner at the opposite end. As a result of the transmission components being able to rotate, a force generated by a rotary movement of the backrest is transmitted to the rail adjuster by means of the coupler and the rocker. In this case, when a reversal point of the transmission unit is passed in the entry position, the rocker reverses its direction of rotation and the force transmission is reduced, advantageously resulting in the rail adjuster being locked.

In a further configuration of the backrest adjuster, the tension element is a Bowden cable. Thus, installation space can be designed virtually independently of the tension element in the region of the backrest adjuster, since the tension element exhibits great flexibility and can be arranged in a functionally reliable manner about other components arranged in this region.

In another configuration of the backrest adjuster, the fitting is a rotary fitting or a latching fitting, by means of which, compared with other types of fitting, particularly small installation dimensions and a high degree of variability in attachment to the seat are able to be realized. A suitable rotary fitting is known for example from WO 2014/128297 A1. A suitable latching fitting is known for example from WO 2014/053400 A1.

According to one development of the backrest adjuster, the coupler has a slot in the region connected to the fitting upper part. On account of the slot at the fitting-side end of the coupler, the backrest adjuster and thus the transmission unit is not actuated in the event of seat adjustment in the region of the sitting position, i.e. without leaving the latter. Furthermore, the slot serves as tolerance compensation when the backrest adjuster is mounted. Integrated into the fitting is an end stop which prevents the backrest from being folded down further with respect to the cargo floor position. The slot prevents the transmission unit from assuming a function of the end stop.

According to the invention, a vehicle seat comprises at least one such backrest adjuster, wherein small dimensions of the vehicle seat compared with the prior art are able to be realized in the region of the backrest adjuster and the distance between the user of the vehicle seat and the backrest adjuster is significantly increased and advantageously sitting comfort is increased and/or a risk of injury caused by a collision is reduced.

Exemplary embodiments of the invention are explained with reference to drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
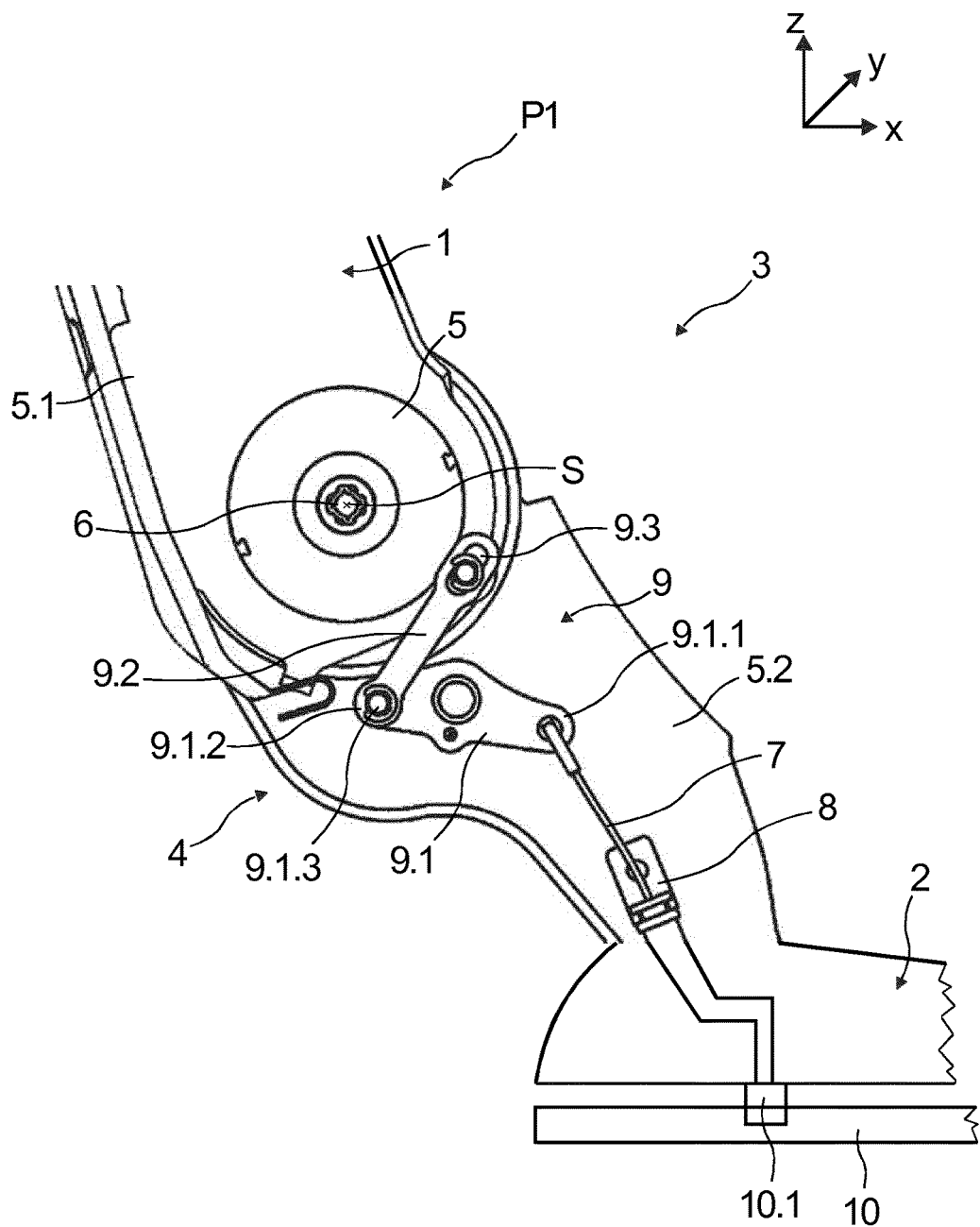
FIG. 1 is a schematic side view showing a backrest adjuster according to the invention.

Referring to the drawings, mutually corresponding parts are provided with the same reference signs in all the figures.

FIG. 1 schematically shows an exemplary embodiment of a seat 3, in particular a vehicle seat, having a backrest adjuster 4 according to the invention. FIG. 1 shows a backrest 1 which is positioned in a design position or sitting position P1 relative to a seat part 2. The backrest 1 and the seat part 2 are components of the seat 3, which is arranged on rails 10 and is lockable and/or unlockable by means of a rail adjuster 10.1 that acts as a rail unlocking mechanism, such that the seat 3 is displaceable in the direction of travel on the rails 10.

Figure 2A:
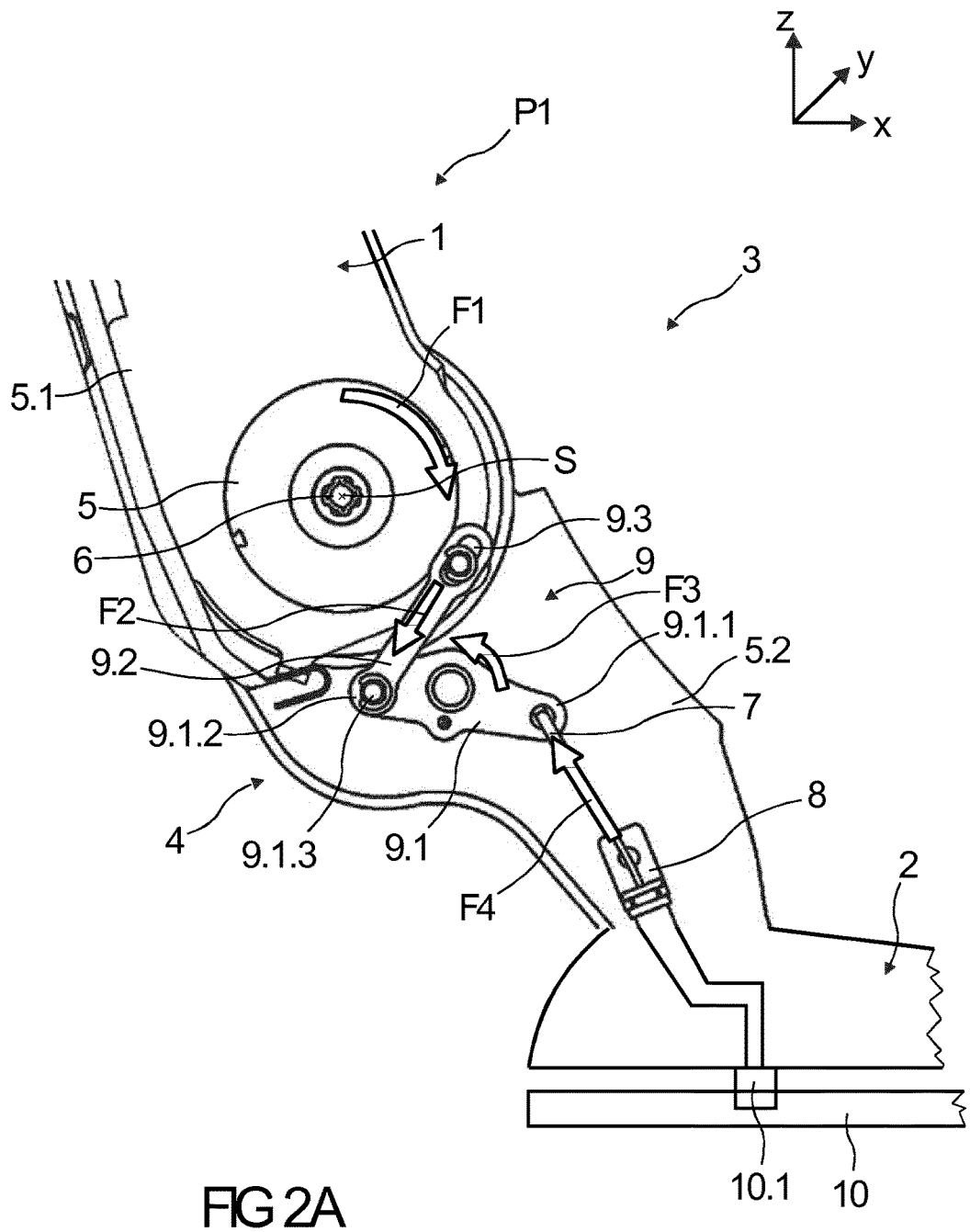
FIG. 2A is a schematic side view showing the backrest adjuster according to the invention in one of various positions.
Figure 2B:
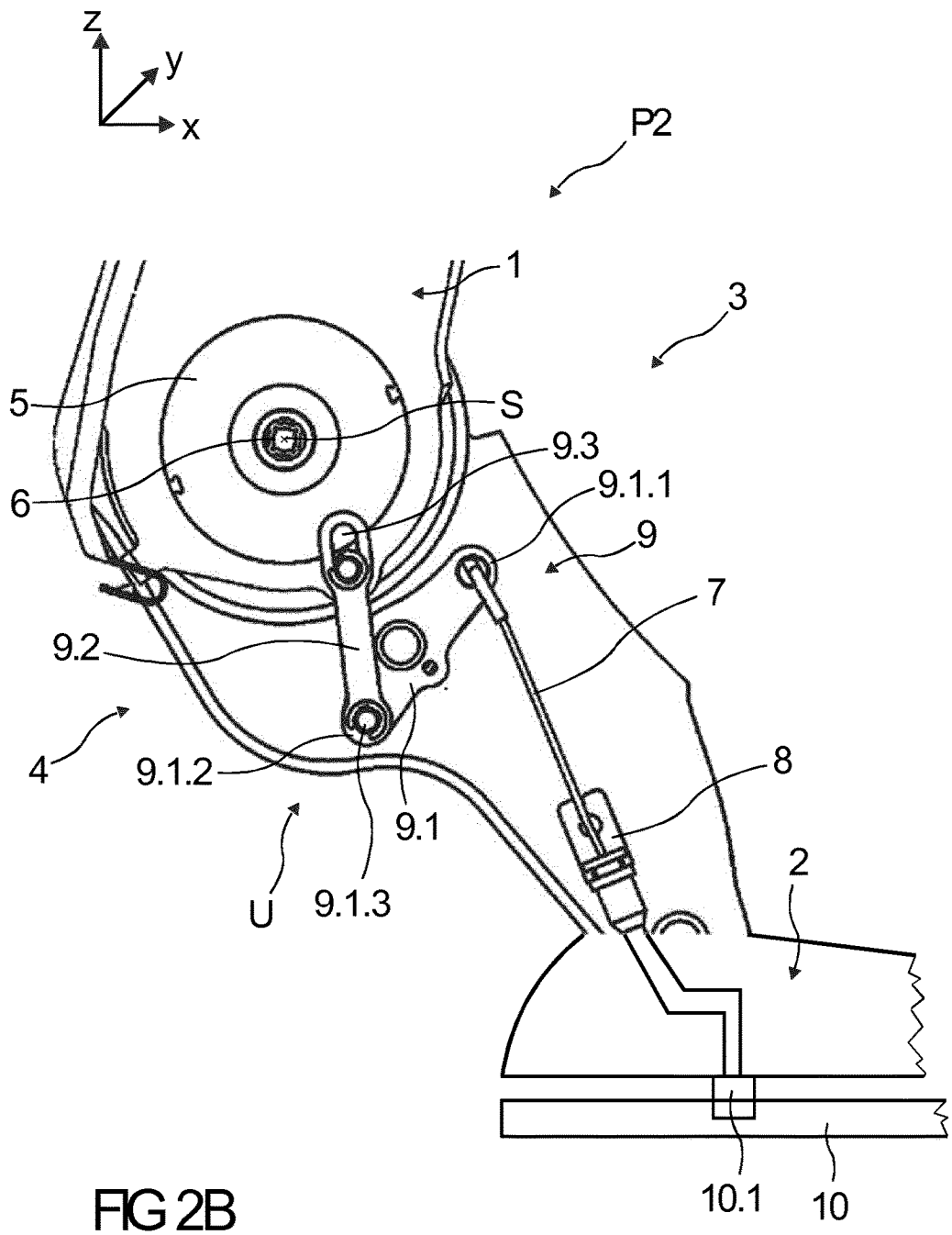
FIG. 2B is a schematic side view showing the backrest adjuster according to the invention in another of various positions.
Figure 2C:
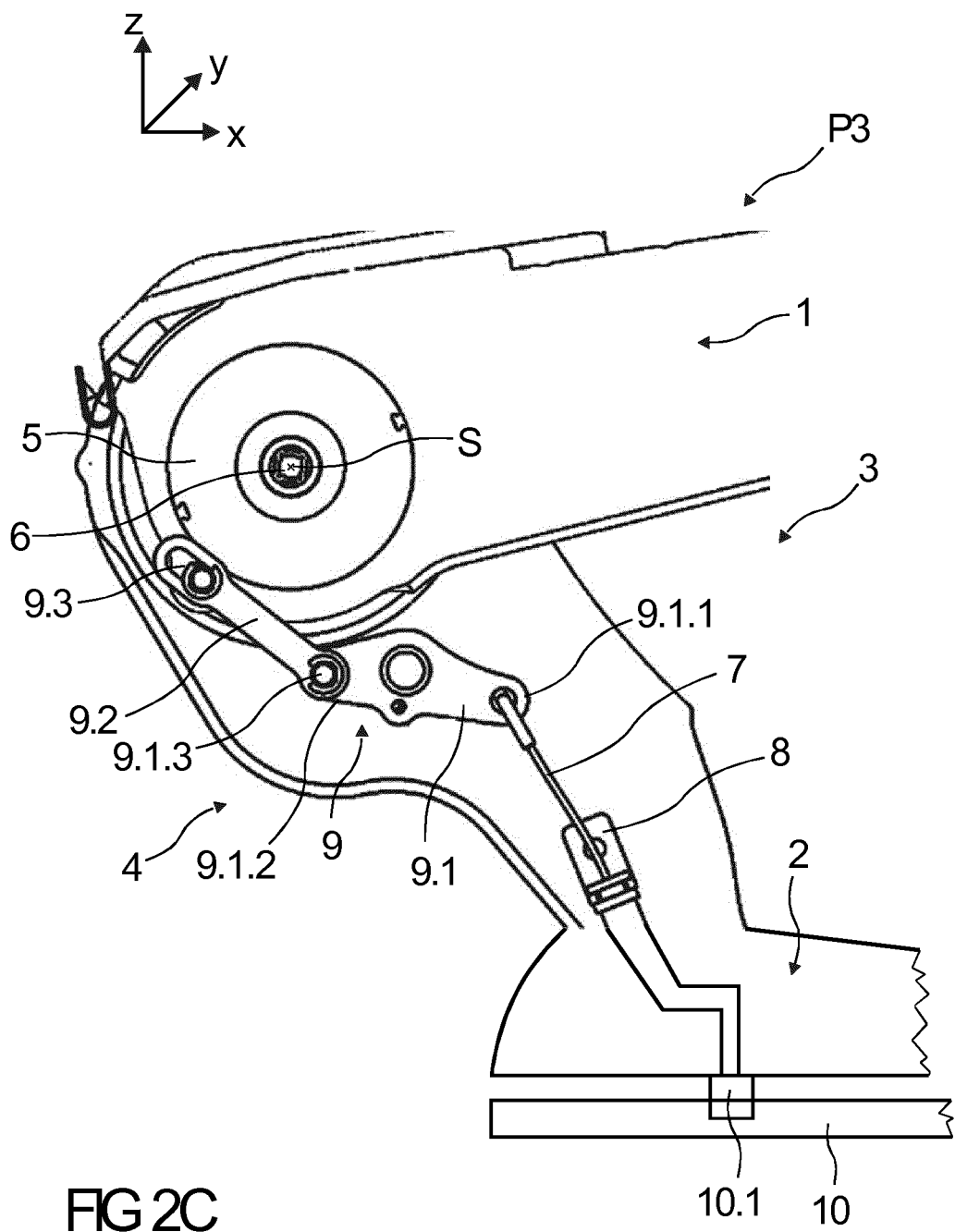
FIG. 2C is a schematic side view showing the backrest adjuster according to the invention in another of various positions.

FIGS. 1 and 2A show the backrest 1 in the sitting position P1, whereas FIG. 2B shows the backrest 1 in a forwardly inclined position P2, for example in an easy-entry position, in which the backrest 1 is inclined by about +35° with respect to the sitting position P1 in FIG. 1. FIG. 2C shows the backrest 1 in a cargo floor position P3, inclined further forward from the sitting region, in which the backrest 1 is inclined for example by about 98° with respect to the sitting position P1 in FIG. 1.

For backrest adjustment, the seat 3 comprises a backrest adjuster 4 which has at least one fitting 5 which is connected, in a manner not illustrated in more detail, to an opposite pivot bearing by means of a transmission rod 6. Alternatively, the seat 3 can have two fittings 5, in a manner not illustrated in more detail, which are connected via the transmission rod 6.

The arrangement of the seat 3 in the vehicle in this case defines the coordinate system used below, comprising a vertical axis z, a longitudinal axis x and a transverse axis y, wherein the vertical axis z is parallel to the vehicle vertical orientation, the longitudinal axis x is parallel to the vehicle longitudinal orientation and the transverse axis y is parallel to the vehicle transverse orientation.

The seat 3 is for example a front seat or a vehicle seat of a rear, for example second seat row for a vehicle and is able to be arranged on rails 10, with the result that the seat 3 is displaceable in the longitudinal direction of the vehicle.

In order to simplify entry into a back-seat region or a rear seat row of the vehicle, the seat 3 has an easy-entry function that is able to be realized by means of the fitting(s) 5.

The easy-entry function is an entry aid which allows enlarged and thus more comfortable access to the back-seat region, in particular of a two-door vehicle, or to a rear seat row of a multi-door vehicle. By means of the easy-entry function, the seat 3 is displaced in the direction of travel on the rails 10 in order to enlarge the entry region, wherein, at the same time, the backrest 1 of the seat 3 is folded forward. In this case, a pivoting range of the backrest 1 with the easy-entry function triggered is limited, for example limited to up to 35° forward into an easy-entry position.

Furthermore, the backrest 1 can be pivoted into a further position, in particular into the cargo floor position P3. In this cargo floor position P3 or table position, the backrest 1 is arranged substantially parallel to the seat part 2, as shown in FIG. 2C.

The backrest 1 is pivotable about a pivot axis S which extends parallel to the transverse direction y. The pivoting of the backrest 1, that is to say of the fitting 5, is able to be triggered by actuating an actuating lever (not illustrated). The actuating lever is provided for example only on one side of the seat 3.

The fitting 5 has a fitting upper part 5.1 and a fitting lower part 5.2. The fitting upper part 5.1 is fastened to the backrest 1 in a fixed manner or is integrated into the structure thereof, and the fitting lower part 5.2 is fastened so as to be fixed to the substructure, for example to the rail 10 on the vehicle floor, or is integrated into a seat substructure. The fitting 5 is configured such that, in the event of unlocking, a relative rotary movement between the fitting upper part 5.1 and the fitting lower part 5.2 takes place when the inclination of the backrest 1 relative to the seat part 2 is adjusted. To this end, further fitting components, which are lockable to and unlockable from one another, are arranged between the fitting upper part 5.1 and the fitting lower part 5.2. The fitting upper part 5.1 and the fitting lower part 5.2 can each be configured as an adapter part firmly connected to a fitting part.

The fittings 5 arranged on each side of the backrest 1, or the one-sided fitting 5 with the opposite pivot bearing is or are coupled together via the transmission rod 6 in the form of a cranked transmission rod 6 or of a tube, such that locking of the backrest 1 is able to be undone on both sides in order to be able to pivot same. In this case, the respective fitting 5 is fastened to the respective end of the transmission rod 6 in a form-fitting manner. Such a transmission rod and the arrangement thereof between two fittings is known for example from DE 43 40 696 C1.

In order to unlock the rail adjuster 10.1, a tension element 7, in particular a Bowden cable, is provided, which comprises at least one counterbearing 8. By means of this unlocking, it is possible to displace the seat 3 on the rails 10 in the direction of the longitudinal axis x.

Alternatively, in an exemplary embodiment that is not illustrated, the tension element 7 is a coupling rod.

The tension element 7 is linked to the transmission unit 9 at a fitting-side end.

The tension element 7 is connected to the fitting 5 by means of the transmission unit 9. In this case, the transmission unit 9 is configured as a multipart coupling unit, in particular as a two-part coupling unit (as illustrated) or three-part coupling unit (not illustrated), and comprises at least one rocker 9.1 and one coupler 9.2. The rocker 9.1 is mounted in a rotatable manner on the fitting lower part 5.2 and has a respective lever arm 9.1.1, 9.1.2 to the right and left of this mounting.

A first lever arm 9.1.1 arranged to the right of the axis of rotation of the rocker 9.1 in the figures has an eye into which one end of the tension element 7 configured as a Bowden cable is fitted. A second lever arm 9.1.2 arranged to the left of the axis of rotation of the rocker 9.1 in the figures has a pin 9.1.3 holding the coupler 9.2, said pin allowing the coupler 9.2 to rotate.

The transmission unit 9 is a two-member coupling unit which comprises the rocker 9.1 and the coupler 9.2. The rocker 9.1 is mounted in a rotatable manner on the fitting lower part 5.2, in particular on a bearing pin fastened to the fitting lower part 5.2. The coupler 9.2 is linked to the fitting upper part 5.1 in a rotatable manner at one end and is linked to the rocker 9.1 at the opposite end. The tension element 7, for unlocking, in particular rail unlocking, connects the rocker 9.1 to the rail adjuster 10.1.

In one possible embodiment, the rocker 9.1 is spring-loaded so as to prevent the backrest adjuster 4 from rattling.

FIGS. 2A to 2C show the folding or adjusting mechanism of the backrest adjuster 4 with the backrest 1 in the various positions P1 to P3.

FIG. 2A shows the seat 3 in the sitting position P1. When the actuating lever is actuated, the fitting 5 is unlocked such that the backrest 1 is pivotable from the sitting position P1 into the entry position P2. On account of the pivoting movement, that end of the coupler 9.2 that is linked to the fitting upper part 5.1 also pivots. As a result, the coupler 9.2 moves downward as per arrow F2, with the result that the rocker 9.1 is rotated counterclockwise as per arrow F3. The first lever arm 9.1.1 of the rocker 9.1 exerts a force, in the present case a tensile force, on the tension element 7 as per the arrow F4, wherein said tension element 7 unlocks the rail adjuster 10.1 and thus it is possible to displace the seat 3 on the rails 10 in the vehicle direction.

FIG. 2B shows the seat 3 in the entry position P2. The transmission unit 9 has, in the entry position P2, a reversal point U, wherein the coupler 9.2 is arranged substantially vertically and thus deflects the tension element 7 to a maximum extent. If the backrest 1 is pivoted into the sitting position P1 or into the cargo floor position P3, the coupler 9.2 moves out of the vertical position and the deflection of the tension element 7 reduces.

In this position, position P2, the easy-entry position, the transmission unit 9 (also referred to as coupling mechanism) reaches its reversal point U (see FIG. 2B).

FIG. 2C shows the seat 3 in the cargo floor position P3. The backrest 1 has been folded down substantially horizontally and parallel to the seat part 2, wherein the coupler 9.2 has been moved beyond the reversal point U such that the direction of rotation of the rocker 9.1 has reversed, wherein the latter has rotated in the clockwise direction and thus a deflection of the tension element 7 has been reduced. The tension element 7 does not exert any force on the rail adjuster 10.1, and so the latter is locked and the seat 3 is prevented from being displaced.

While the backrest 1 is folded down into the cargo floor position P3 (also known as the flat-floor position, see FIG. 2C), the direction of rotation of the rocker 9.1 is reversed. As a result, the tension element 7 is relieved of tension. The rotation of the rocker 9.1 takes place in the clockwise direction and is supported by the spring pretensioning in the rail unlocking mechanism 10.1 via the tension element 7 (the Bowden cable). In this position, the rails 10 are locked again (see FIG. 2C).

As is shown in all the figures, the coupler 9.2 has, in the region connected to the fitting upper part 5.1, a slot 9.3 which fulfills a number of functions:

On account of the slot 9.3, the backrest adjuster 4 and thus the coupling mechanism is not actuated in a comfort region of the backrest 1, in particular in one of the sitting positions P1. In order to increase comfort, the backrest 1 can take up several angular positions (sitting positions P1) which define the comfort region. Furthermore, the slot 9.3 serves as tolerance compensation when the backrest adjuster 4 is mounted. An end stop is integrated in the fitting 5 in a manner not illustrated in more detail, said end stop preventing the backrest 1 from being folded down further with respect to the cargo floor position P3. The slot 9.3 prevents the coupling mechanism from assuming the function of the end stop.

While specific embodiments of the invention have been shown and described in detail to illustrate the application of the principles of the invention, it will be understood that the invention may be embodied otherwise without departing from such principles.

The invention claimed is:

1. A backrest adjuster for a seat which comprises a backrest that is adjustable relative to a seat part by means of a fitting, and which is arranged in a longitudinally movable manner on a rail, the backrest adjuster comprising:
   a transmission unit comprising a coupler and a rocker;
   a tension element; and
   a rail adjuster wherein, when the backrest is moved from a sitting position into an entry position, the transmission unit actuates the tension element such that the tension element unlocks the rail adjuster, and locks the rail adjuster when the backrest is moved in the opposite direction, wherein the coupler is linked, at one end, rotatably to the rocker.

2. The backrest adjuster as claimed in claim 1, wherein, when the backrest is moved from the entry position into a cargo floor position, the transmission unit actuates the tension element such that the tension element locks the rail adjuster, and unlocks the tension element when the backrest is moved in the opposite direction.

3. The backrest adjuster as claimed in claim 1, wherein the transmission unit comprises a multipart configuration.

4. The backrest adjuster as claimed in claim 1, wherein the transmission unit has a two-part configuration that comprises the rocker and the coupler.

5. The backrest adjuster as claimed in claim 4, wherein the rocker is rotatably mounted on a fitting lower part that is arranged on the seat part.

6. The backrest adjuster as claimed in claim 4, wherein the coupler is linked, at another end, rotatably to a backrest-side fitting upper part.

7. The backrest adjuster as claimed in claim 4, wherein the coupler has a slot in the region connected to the fitting upper part.

8. The backrest adjuster as claimed in claim 4, wherein, during a transition from the sitting position into the cargo floor position, the direction of rotation of the rocker reverses.

9. The backrest adjuster as claimed in claim 8, wherein the direction of rotation of the rocker reverses when an intermediate position is reached comprising the entry position.

10. The backrest adjuster as claimed in claim 1, wherein the tension element is a Bowden cable.

11. The backrest adjuster as claimed in claim 1, wherein the fitting is a rotary fitting.

12. The backrest adjuster as claimed in claim 1, wherein the fitting is a latching fitting.

13. A vehicle seat comprising:
   a seat part;
   a fitting connected to the seat part;
   a backrest connected to the fitting and adjustable relative to a seat part by the fitting;
   a rail, the seat part, fitting and backrest being arranged in a longitudinally movable manner on the rail; and
   at least one backrest adjuster comprising:
      a transmission unit comprising a rocker and a coupler, wherein the coupler is linked, at one end, rotatably to the rocker;
      a tension element; and
      a rail adjuster wherein, when the backrest is moved from a sitting position into an entry position, the transmission unit actuates the tension element such that the tension element unlocks the rail adjuster, and locks the rail adjuster when the backrest is moved from the entry position in a direction of the sitting position.

14. The vehicle seat as claimed in claim 13, wherein the vehicle seat is a front seat, a rear seat or a second row seat for a vehicle.

15. The vehicle seat as claimed in claim 13, wherein, when the backrest is moved from the entry position into a cargo floor position, the transmission unit actuates the tension element such that the tension element locks the rail adjuster, and unlocks the rail adjuster when the backrest is moved from the cargo floor position in a direction of the entry position.

16. The vehicle seat as claimed in claim 13, wherein the rocker is rotatably mounted in a rotatable manner on a fitting lower part that is arranged on the seat part.

17. The vehicle seat as claimed in claim 13, wherein the coupler is linked, at another end, rotatably to a backrest-side fitting upper part.

18. A backrest adjuster for a seat which comprises a backrest that is adjustable relative to a seat part by means of a fitting, and which is arranged in a longitudinally movable manner on a rail, the backrest adjuster comprising:
   a transmission unit;
   a tension element; and
   a rail adjuster wherein, when the backrest is moved from a sitting position into an entry position, the transmission unit actuates the tension element such that the tension element unlocks the rail adjuster, and locks the rail adjuster when the backrest is moved in the opposite direction, the transmission unit having a two-part configuration comprising at least one rocker and one coupler, wherein the coupler has a slot in the region connected to the fitting upper part.

19. The backrest adjuster as claimed in claim 18, wherein, during a transition from the sitting position into the cargo floor position, the direction of rotation of the rocker reverses.

20. The backrest adjuster as claimed in claim 19, wherein the direction of rotation of the rocker reverses when an intermediate position is reached comprising the entry position.

* * * * *